J. A. SHEARER.
SPRING SUSPENSION FOR MOTOR CARS AND OTHER VEHICLES AND TRAVELING MACHINES.
APPLICATION FILED MAR. 12, 1913.

1,126,304.  Patented Jan. 26, 1915.

WITNESSES
W. C. Baker
J. D. Rollhaus

INVENTOR
John Alexander Shearer
BY
ATTORNEYS

UNITED STATES PATENT OFFICE.

JOHN ALEXANDER SHEARER, OF PARKSIDE, SOUTH AUSTRALIA, AUSTRALIA.

SPRING SUSPENSION FOR MOTOR-CARS AND OTHER VEHICLES AND TRAVELING-MACHINES.

1,126,304.

Specification of Letters Patent.

Patented Jan. 26, 1915.

Application filed March 12, 1913. Serial No. 753,725.

*To all whom it may concern:*

Be it known that I, JOHN ALEXANDER SHEARER, blacksmith, a subject of the King of Great Britain and Ireland, residing at Glen Osmond Road, Parkside, State of South Australia, Commonwealth of Australia, have invented a certain new and useful Improved Spring Suspension for Motor-Cars and other Vehicles and Traveling-Machines, of which the following is a specification.

This invention relates to the suspension or mounting of the frame of a motor car or other vehicle or traveling machine upon its axles by means of levers connected with each axle and pivoted to the frame and adapted to be moved against the action of a spring or springs when said axle is raised so as to absorb the shock or jar caused by the passage over rough roads or over irregularities or obstacles and the object of this invention is to provide an improved construction of this nature which will more efficiently prevent the transmission of shock or jar to the frame of the car vehicle or machine.

According to my invention each end of the axle is attached to the pivotally connected adjacent inner ends of two longitudinal and approximately horizontal links the outer end or ends of one or both of which is or are pivotally connected to the frame of the car, vehicle or machine by a lever and spring device which tends to keep the links as nearly as possible in a straight line and to restore them thereto after displacement. There are two links, one in front and one behind, with a lever and spring device at each end of each axle. As the wheel passes over an obstruction it lifts the axle and carries with it the adjacent inner ends of the links, the outer ends of the links being drawn together horizontally in opposition to the pull of the spring device and without any direct lift of the frame.

In order that my invention may be the more clearly understood I will describe the same with reference to the accompanying drawings in which:—

Figure 1:
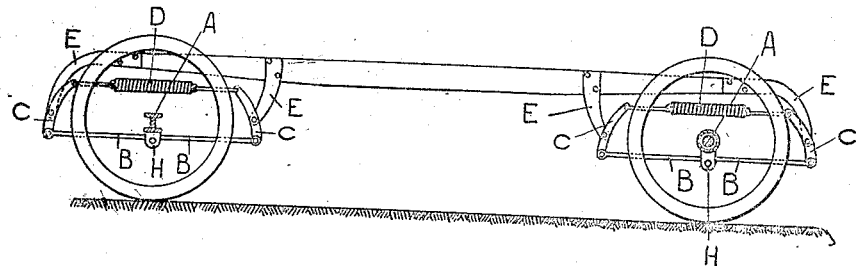
Figure 2:
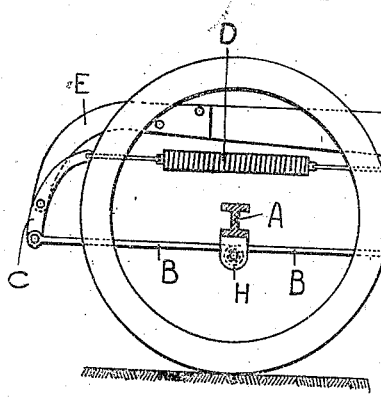
Figure 3:
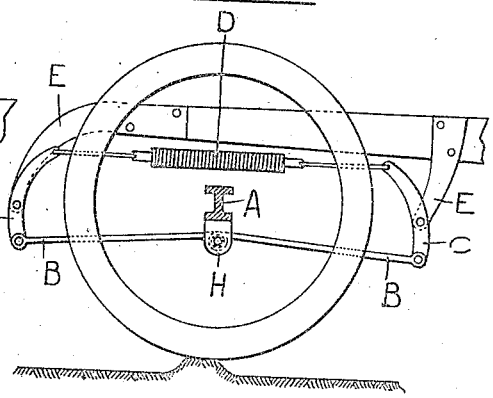

Figure 1 is a side view showing the front and rear axles provided with independent suspension devices; and Figs. 2 and 3 are side views to a somewhat larger scale showing in Fig. 2 the several parts in normal position and in Fig. 3 the several parts when passing over an obstacle.

As shown in the drawing the axle A is attached to the pivotally connected adjacent inner ends of two approximately horizontal links B B, the outer ends of which are pivotally attached to the lower ends of two approximately vertical levers C C the upper ends of which are connected together by a spring D or set of springs tending to draw them together, the levers C C being pivoted at about their center to brackets E E secured to and projecting downward from the frame of the car, vehicle or machine. The axle is attached to the connecting pin of the links by a suitable bracket or clip H, and the several pivoted attachments may be made by turned pins or bolts and if desired with ball bearings. The brackets E E may be integral with the side bars of the car, vehicle or machine or they may be riveted or otherwise suitably secured thereto. The effect of this method of suspension is that the wheels and the axle, in passing over an obstruction or any unevenness in the road, are able to move up and down without transmitting any concussion or jar to the frame. The axle A and the adjacent inner ends of the links B B move upward, the outer ends of the links move horizontally inward rocking the levers C C on their pivots and distorting the spring D without practically lifting the levers vertically and consequently without lifting the frame. The spring in recovering from its distortion restores the levers to their vertical position and the links to their horizontal position.

Having now fully described and ascertained my said invention and the manner in which it is to be performed I declare that what I claim is:—

1. An improved suspension for motor cars and other vehicles and traveling machines comprising, near each end of the axle, two longitudinal and approximately horizontal links the adjacent inner ends of which are pivotally connected together and to the axle and the outer ends of which are pivotally attached to the lower ends of two approximately vertical levers, the upper ends of which are connected together by a spring or springs tending to draw them together, and the levers being pivoted at about their centers to brackets secured to and depending downward from the frame of the car, vehicle or machine.

2. The combination with a vehicle frame and an axle, of a suspension means comprising a pair of approximately horizontal toggle links connected with the axle at their common center of movement, approximately vertical rocking levers to which the outer ends of the links are connected, said levers being pivoted on the frame, and a spring connected with the opposite ends of said levers and opposing the movement thereof by the axle.

In testimony that I claim the foregoing as my invention I have signed my name in the presence of two subscribing witnesses this 30th day of January 1913.

JOHN ALEXANDER SHEARER.

Witnesses:
ARTHUR GORE COLLISON,
LESLIE HERBERT BROADBENT.